US008711717B2

(12) United States Patent
Jersenius et al.

(10) Patent No.: US 8,711,717 B2
(45) Date of Patent: Apr. 29, 2014

(54) METHOD OF REQUESTING CQI REPORTS

(75) Inventors: Kristina Jersenius, Linkoping (SE); Eva Englund, Linkoping (SE); Magnus Lindstrom, Spanga (SE); Henning Wiemann, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 411 days.

(21) Appl. No.: 12/994,487

(22) PCT Filed: May 26, 2008

(86) PCT No.: PCT/SE2008/050621
§ 371 (c)(1),
(2), (4) Date: Nov. 24, 2010

(87) PCT Pub. No.: WO2009/145684
PCT Pub. Date: Dec. 3, 2009

(65) Prior Publication Data
US 2011/0134780 A1    Jun. 9, 2011

(51) Int. Cl.
*H04L 12/26* (2006.01)

(52) U.S. Cl.
USPC ............................................. 370/252

(58) Field of Classification Search
USPC ............... 370/252, 329; 455/422, 450, 452
See application file for complete search history.

(56) References Cited

U.S. PATENT DOCUMENTS

| | | | | |
|---|---|---|---|---|
| 2005/0226198 | A1* | 10/2005 | Barak et al. | 370/345 |
| 2005/0233754 | A1* | 10/2005 | Beale | 455/452.2 |
| 2008/0045228 | A1* | 2/2008 | Zhang et al. | 455/450 |
| 2008/0064386 | A1* | 3/2008 | Nibe | 455/422.1 |
| 2008/0081634 | A1* | 4/2008 | Kaikkonen et al. | 455/452.1 |
| 2008/0165697 | A1* | 7/2008 | Zeira et al. | 370/252 |
| 2009/0168686 | A1* | 7/2009 | Love et al. | 370/312 |
| 2009/0196237 | A1* | 8/2009 | Jonsson | 370/329 |

FOREIGN PATENT DOCUMENTS

| | | | |
|---|---|---|---|
| EP | 1641189 A1 | 3/2006 | |
| WO | 2008/027672 A2 | 3/2008 | |
| WO | WO 2008027672 A2 * | 3/2008 | ............... H04L 1/00 |
| WO | 2008/038104 A2 | 4/2008 | |

OTHER PUBLICATIONS

3rd Generation Partnership Project. "CQI Reporting on the PUSCH." 3GPP TSG-RAN Wg1 #51bis, R1-080363, Sevilla, Spain, Jan. 14-18, 2008.*

(Continued)

*Primary Examiner* — Chi Pham
*Assistant Examiner* — Fahmida Chowdhury
(74) *Attorney, Agent, or Firm* — Coats and Bennett, P.L.L.C.

(57) ABSTRACT

In a method and a device for requesting Channel Quality Indication (CQI) reports from a mobile station of a cellular radio system, the CQI reports are requested in response to a measured Block Error Rate (BLER) of transmissions from the mobile station. In accordance with one embodiment of the present invention a CQI report is requested if the BLER of the mobile station is above a predetermined threshold value C. The threshold value C can be set to a value related to the BLER target. In particular the value C can be set to the same value or as a value close the BLER that is targeted to try to adapt the CQI report request to how well the base station knows the channel. It can also be set higher or lower to also consider how much CQI reporting the base station estimates can be afforded when it comes to uplink resources and uplink grant signaling in the downlink.

26 Claims, 3 Drawing Sheets

(56) References Cited

OTHER PUBLICATIONS

Title: CQI Reporting on the PUSCH, Source: Ericsson, 3GPP TSG-RAN WG1 #51 bis, Sevilla, Spain, Jan. 14-18, 2008.*

3rd Generation Partnership Project. "Scheduling and Multiplexing of CQI and ACK/NACK Feedback for Single Carrier FDMA in Evolved UTRA Uplink." TSG-RAN WG1 WG1 LTE AD Hoc Meeting, R1-060155, Helsinki, Finland, Jan. 23-25, 2006.

3rd Generation Partnership Project. "Control of CQI Feedback Signalling in E-UTRA." 3GPP TSG RAN WG1 meeting #48, Tdoc R1-071093, St. Louis, USA, Feb. 12-16, 2007.

3rd Generation Partnership Project. "On CQI Reporting." 3GPP TSG-RAN WG1 Meeting #50, R1-073746, Athens, Greece, Aug. 20-24, 2007.

3rd Generation Partnership Project. "CQI Reporting on the PUSCH" 3GPP TSG-RAN Wg1 #51bis, R1-080363, Sevilla, Spain, Jan. 14-18, 2008.

* cited by examiner

METHOD OF REQUESTING CQI REPORTS

TECHNICAL FIELD

The present invention relates to a method and a device for requesting CQI reports in a cellular radio system.

BACKGROUND

The 3GPP work on standardization of the Long Term Evolution (LTE) concept is currently ongoing. In LTE the downlink will support channel dependent scheduling in both the time and frequency domains. The radio base station in the LTE network denoted evolved NodeB (eNodeB) will transmit reference signals that the mobile stations also termed User Equipments (UEs) use to determine the downlink channel quality. The UEs will send Channel Quality Indication (CQI) reports back to the eNodeB that are used by a scheduler located in the eNodeB for scheduling traffic within the cell that the eNodeB serves.

In the LTE network the UE is specified to be able to transmit different types of CQI reports. For example the UE will have the capability to transmit a full CQI reports and partial CQI reports. Full CQI report covers the whole downlink transmission bandwidth but they may have different frequency resolution. they may be filtered and processed in different ways, and they may be encoded in different ways, see also 3GPP TS 36.213 V8.2.0. "Physical layer procedures".

Furthermore, CQI reports used together with Single Input Single Output (SISO), Multiple Input Single Output (MISO), Single Input Multiple Output (SIMO), or Multiple Input Multiple Output (MIMO) transmission could also be different for the different transmission cases. To exemplify, for MIMO a CQI report may e.g. include pre-coding weights to be used by the eNodeB multiple antenna transmission scheme.

The LTE uplink is based on single-carrier modulation and uses frequency division multiple access (FDMA) and time division multiple access (TDMA) principles. The LTE uplink consists of physical uplink control channels and data channels that are orthogonally frequency multiplexed. The single-carrier property of the LTE uplink makes it impossible for a UE to transmit on a physical control channel and a physical data channel in the same transmission-time-interval (TTI). Hence if a UE is transmitting data on a physical data channel the CQI that must be sent in the same TTI must also be sent on the physical data channel. When the CQI is transmitted on the physical data channel it is multiplexed with data. The UE will use the physical control channel to transmit CQI only in the case when the UE has no data transmission, and hence is not using the physical data channel.

The current assumption in 3GPP regarding the CQI reporting on the physical control channel is that a maximum of approximately 10 bits can be transmitted per UE and TTI. This number of bits leaves little space for fine granular CQI frequency domain information and MIMO information. On the physical data channel it will most likely be possible to transmit more bits.

When a UE is scheduled for data transmission on the physical channel it is signaled an uplink grant including resource block allocation and transport format selection. The uplink grant also includes 1 bit which indicates if a CQI report should be included in the uplink transmission or not. see R1-080597, Summary of AH on AI 6.3.5 "UE procedure for downlink shared channel". The format of this CQI report is Radio Resource Control (RRC) configured.

When the eNodeB has transmitted data to the UE it receives a Hybrid Automatic Repeat Request (HARQ) Acknowledgement (ACK) or Negative Acknowledgement (NACK) from the UE. The eNodeB can for example keep track of the percentage of the number of downlink transmissions that are NACKed in the first transmission attempt, or any other predefined HARQ block error rate (BLER). It is often considered beneficial to keep the HARQ BLER at a certain target, for example 10%.

One way of using the uplink grant bit for requesting CQI is to set the grant bit when there is downlink data and a CQI report has not been received during a predetermined time T. It is however difficult to set the optimal time T. If T is set too large there will be a performance loss and if T is set too small the CQI report is transmitted unnecessarily often which results in a cost in terms of grant signaling in the downlink and uplink resources.

Hence, there exist a need for a method and a system that improve the procedure by means of which it is determined when CQI reports are transmitted from the UE.

SUMMARY

Embodiments herein provide an improved method and system for determining when CQI reports are to be transmitted from a UE in a cellular radio system.

In some embodiments, for example, Channel Quality Indication (CQI) reports from a mobile station of a cellular radio system are requested in response to a measured Block Error Rate (BLER) of transmissions from the mobile station.

In accordance with one embodiment of the present invention a CQI report is requested if the BLER of the mobile station is above a predetermined threshold value C. The threshold value C can be set to a value related to the BLER target. In particular the value C can be set to the same value or as a value close the BLER that is targeted to try to adapt the CQI report request to how well the base station knows the channel. It can also be set higher or lower to also consider how much CQI reporting the base station estimates can be afforded when it comes to uplink resources and uplink grant signaling in the downlink.

Embodiments herein also include a radio base station adapted to request CQI reports in accordance with the above.

Embodiments herein thus improved the process of determining when CQI reports are transmitted from a mobile station. This will reduce the amount of data traffic over the radio interface and hence save radio resources and at the same time maintain or even improve the information used by a scheduler when scheduling transmission within a cell of the radio system.

BRIEF DESCRIPTION OF THE DRAWINGS

The present invention will now be described in more detail by way of non-limiting examples and with reference to the accompanying drawings, in which.

DETAILED DESCRIPTION

Figure 1:
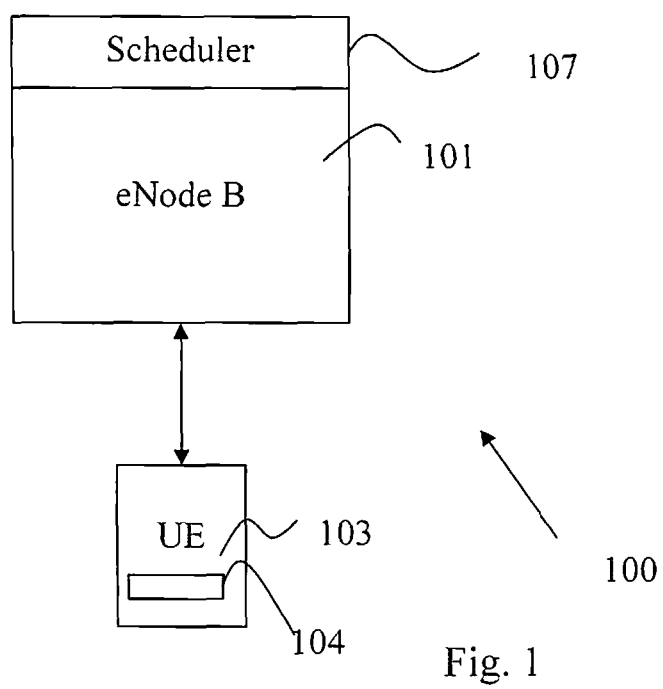
FIG. 1 is a view of a cellular radio system.

In FIG. 1 a view illustrating selected parts of a cellular radio network 100 is shown. In particular the network 100 can be an LTE radio network and the terms used for different parts of the network corresponds to those of an LTE network but the invention is not limited to an LTE network. The network 100 comprises a number of radio base stations. in this example evolved Node Bs (eNodeB) 101, enabling radio access via an air interface for User Equipments (UE) 103 located within a geographical area covered by the network 100. Each eNodeB of the network 100 comprises a scheduler 107 for assigning resources for downlink and for the uplink transmissions.

The scheduler 107 uses Channel Quality Indicators (CQI) reports that are transmitted on the uplink channel from the UE 103 to the scheduler 107 when scheduling down link transmissions. The CQI reports contain information about the downlink channel characteristics for a particular UE 103 in order to make proper allocation decisions. Further the UE 103 comprises a module 104 for generating CQI reports to be transmitted to the radio base station 101

In accordance with the present invention the eNodeB measures the Block Error Rate (BLER) of a UE and is adapted to request a CQI report in response to the measured BLER. For example in accordance with one embodiment of the present invention a CQI report is requested if the BLER of the UE is above a predetermined threshold value C. The request can also depend on if there is downlink data to transmit to the UE. The threshold value C can be set to a value related to the BLER target. In particular the threshold value C can be set to the same value as or as a value close the BLER that is targeted to try to adapt the CQI report request to how well the eNodeB knows the channel. It can also be set higher or lower to also consider how much CQI reporting the eNodeB estimates can be afforded when it comes to uplink resources and uplink grant signaling in the downlink.

In accordance with one embodiment of the present invention if the Hybrid automatic Repeat Request (HARQ) Block Error Rate (BLER) is high, for example above a pre-set threshold value it is regarded as an indication that the eNodeB has poor channel knowledge and would benefit from more CQI reports. In accordance with one embodiment if the HARQ BLER is approximately at the BLER target it is regarded as an indication that the eNodeB has good channel knowledge and does not presently need CQI reports.

In accordance with one embodiment if the BLER is below the BLER target the channel quality knowledge it is regarded as an indication that the channel quality is constantly under estimated or on that the link adaptation is too unaggressive and selects too low code rate and low order of modulation. If the BLER is below the BLER target the link adaptation can be made more aggressive by adding an offset to the CQI values.

When the eNodeB has checked if a CQI report is to be requested a CQI report it can be further adapted to check if there are resources presently available or not. If the UE is already scheduled for uplink transmission there is no need to check if there are any available uplink grants.

The radio base station eNodeB can also be adapted to check if the resource allocation size of the UE is enough to include also CQI. If the resource allocation size of the UE is not enough, the eNodeB can be set to extend the resource allocation size if possible. If it is not possible to increase the amount of resources the eNodeB can be adapted to give priority to CQI reporting and let the UE use some of the already allocated resource for CQI reporting by requesting a CQI report or prioritize data and skip the CQI report request.

In accordance with one embodiment, the eNodeB can be adapted to consider in its transport format selection that some of the allocated resource will be occupied by CQI and is hence not available for data and is adapted to select a transport format that can be used to transmit both data and CQI reports. When the UE is not scheduled the eNodeB can be adapted to check both if there is an available uplink grant for the UE and available uplink resources, if a CQI report is requested.

Figure 2:
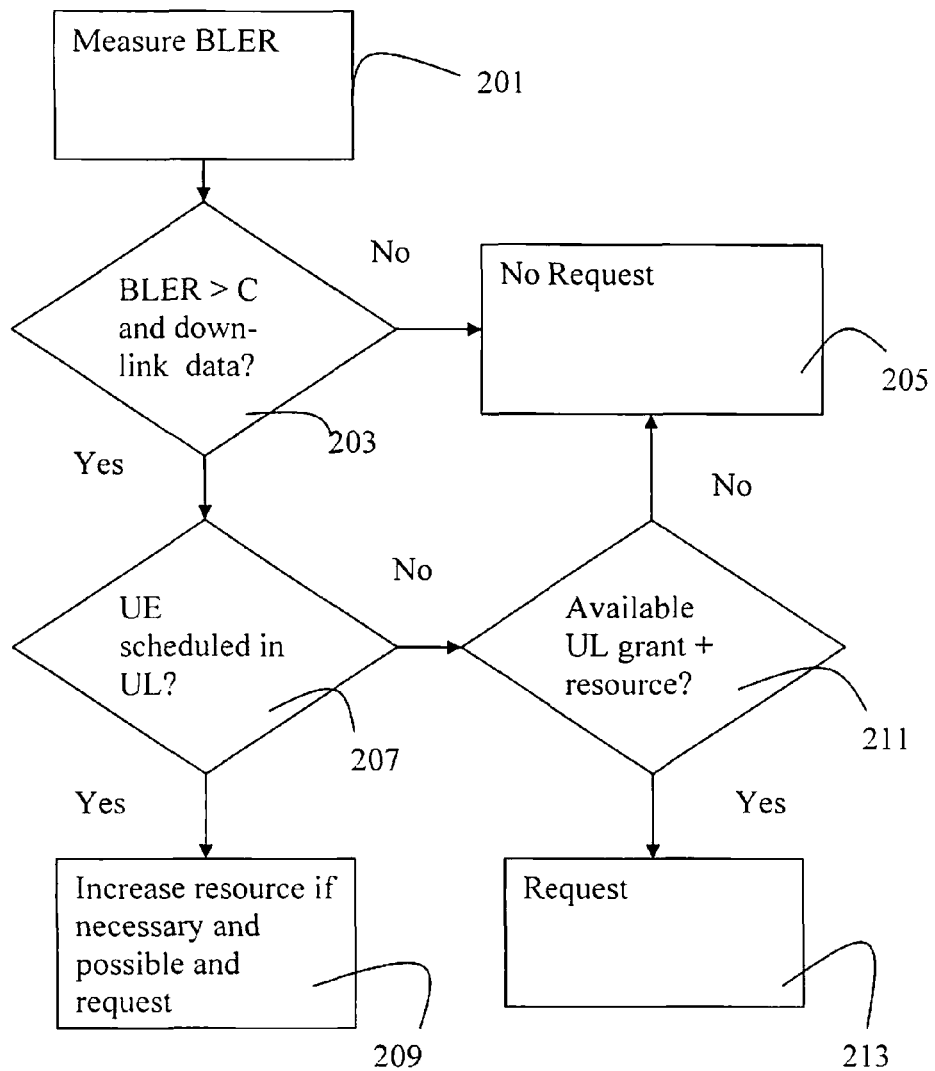
FIG. 2 is a flowchart illustrating procedural steps performed when requesting CQI reports.

In FIG. 2 a flow chart illustrating some procedural steps performed by a base station when requesting CQI reports from a mobile station (UE). First in a step 201, the Block Error Rate (BLER) is measured for a particular UE. Next, in a step 203, it is determined if the BLER is above a threshold value C and if there is down link data to transmit. If the BLER is not above a threshold value C or if there is no down link data to transmit no request is transmitted as indicated in step 205. If the BLER is above a threshold value C and if there is down link data to transmit the procedure continues to a step 207. In step 207 it is checked if the UE is scheduled in the uplink (UL). If in step 207 it is determined that the UE is scheduled in the uplink, the procedure continues to a step 209. In step 209 the base station increases the resources if this is necessary and possible and requests a CQI report.

If in step 207 it is determined that the UE is not scheduled in the uplink, the procedure continues to a step 211. In step 211 it is checked if there are resources available and also if an uplink (UL) grant is available. If in step 211 it is determined that there is no uplink grant available or if there are not enough resources the procedure continues to step 205 where no request for a CQI report is transmitted. If in step 211 it is determined that an uplink grant is available and other necessary resources are also available the procedure continues to a step 213. In step 213 a request for a CQI report is transmitted to the mobile station Since it costs less to request a CQI report for a UE that is already scheduled, in terms of signaling of uplink grants in the downlink and possibly also in uplink resources, the eNodeB can in accordance with one embodiment be adapted to let the CQI report request threshold C depend on if the UE is already scheduled or not and can for example apply a lower threshold value C for UEs that are already scheduled. In one embodiment the uplink channel quality can also be considered in the setting of threshold C. If the uplink channel quality of a UE is high it will cost less in terms of uplink resources to request a CQI report and the eNodeB can be adapted to apply a lower value C for such a UE.

Figure 3:
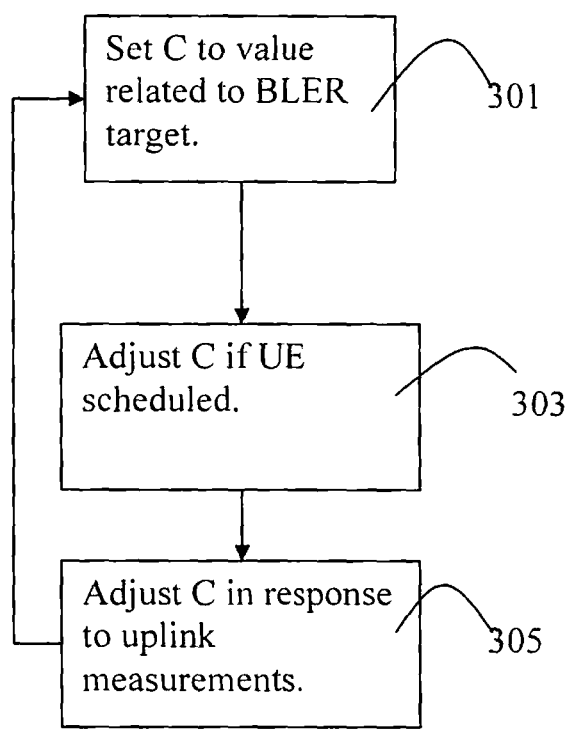
FIG. 3 is a flowchart illustrating further procedural steps performed in a procedure when requesting CQI reports.

In FIG. 3 procedural steps performed when determining the threshold value C in accordance with one exemplary embodiment are depicted. First in a step 301 the threshold value C is set to a value related to the current BLER target. Next, in a step 303 the threshold value is adjusted in response to if the mobile station is scheduled or not. Thereupon, in a step 305 a further adjustment of the threshold value C is made in response to the measured uplink channel quality. The procedure then returns to step 301.

Using the method and radio base station as described herein will improve the use of CQI reports and in particular the cost in terms of radio resources can be reduced.

The invention claimed is:

1. A method of requesting Channel Quality Indication (CQI) reports from a mobile station of a cellular radio system, the mobile station connected to the cellular radio system via a radio base station, the method comprising requesting CQI reports from the mobile station in response to a measured Block Error Rate (BLER) of transmissions from the mobile station.

2. The method according to claim 1, wherein said requesting comprises requesting a CQI report if the radio base station has downlink data to transmit to the mobile station.

3. The method according to claim 1, wherein said requesting comprises requesting a CQI report if the measured BLER is above a predetermined threshold value.

4. The method according to claim 3, further comprising setting the threshold value to a value related to a BLER target of a transmission from the mobile station to the radio base station.

5. The method according to claim 4, wherein said setting comprises setting the threshold value equal to said BLER target.

6. The method according claim 3, further comprising setting the threshold value based on whether or not the mobile station is already scheduled for data transmission to the radio base station.

7. The method according to claim 6, wherein said setting comprises setting the threshold value to a relatively lower threshold value if the mobile station is already scheduled, and setting the threshold value to a relatively higher threshold value if the mobile station is not already scheduled.

8. The method according to claim 3, further comprising setting the threshold value based on an uplink channel quality.

9. The method according to claim 1, wherein said requesting comprises indicating a CQI report request in an uplink grant.

10. The method according to claim 9, wherein the CQI report request indication in the uplink grant is 1 bit.

11. The method according to claim 1, wherein requested CQI reports are transmitted from the mobile station to the radio base station on a physical data channel, and wherein said requesting comprises increasing radio resources allocated to the mobile station on the physical data channel if the mobile station is scheduled for data transmission to the radio base station, if such radio resource increase is necessary for transmission of a requested CQI report to the radio base station, and if such radio resource increase is possible.

12. The method according to claim 11, wherein if the radio resource increase is necessary, but not possible, the method comprises:
   if said data transmission to the radio base station is prioritized over CQI reports, refraining from requesting a CQI report; and
   if CQI reports are prioritized over said data transmission to the radio base station, requesting a CQI report.

13. The method according to claim 1, wherein requested CQI reports are transmitted from the mobile station to the radio base station on a physical data channel, and wherein the method further comprises selecting a transport format for a transmission on the physical data channel that enables the channel to carry both data and requested CQI reports.

14. A node in a cellular radio system adapted to request Channel Quality Indication (CQI) reports from a mobile station connected to the cellular radio system, the node comprising a scheduler configured to request CQI reports from the mobile station in response to a measured Block Error Rate (BLER) of transmissions from the mobile station.

15. The node according to claim 14, wherein the scheduler is configured to request a CQI report if the node has downlink data to transmit to the mobile station.

16. The node according to claim 14, wherein the scheduler is configured to request a CQI report if the measured BLER is above a predetermined threshold value.

17. The node according to claim 16, wherein the scheduler is configured to set the threshold value to a value related to a BLER target of a transmission from the mobile station to the node.

18. The node according to claim 17, wherein the scheduler is configured to set the threshold value equal to said BLER target.

19. The node according to claim 16, wherein the scheduler is configured to set the threshold value based on whether or not the mobile station is already scheduled for data transmission to the radio base station.

20. The node according to claim 19, wherein the scheduler is configured to set the threshold value to a relatively lower threshold value if the mobile station is already scheduled, and set the threshold value to a relatively higher threshold value if the mobile station is not already scheduled.

21. The node according to claim 16, wherein the scheduler is configured to set the threshold value based on an uplink channel quality.

22. The node according to claim 14, wherein the scheduler is configured to request a CQI report by indicating a CQI report request in an uplink grant.

23. The node according to claim 22, wherein the CQI report request indication in the uplink grant is 1 bit.

24. The node according to claim 14, wherein the scheduler is configured to increase radio resources allocated to the mobile station if the mobile station is scheduled for data transmission to the node.

25. The node according to claim 24, wherein the scheduler is configured to prioritize said data transmission over CQI reports, or CQI reports over said data transmission, if the scheduler cannot increase radio resources allocated to the mobile station.

26. The node according to claim 14, wherein requested CQI reports are transmitted from the mobile station to the radio base station on a physical data channel, and wherein the scheduler is further configured to select a transport format for a transmission on the physical data channel that enables the channel to carry both data and requested CQI reports.

* * * * *

UNITED STATES PATENT AND TRADEMARK OFFICE
CERTIFICATE OF CORRECTION

PATENT NO. : 8,711,717 B2  
APPLICATION NO. : 12/994487  
DATED : April 29, 2014  
INVENTOR(S) : Jersenius et al.

Page 1 of 1

It is certified that error appears in the above-identified patent and that said Letters Patent is hereby corrected as shown below:

In the Specification

In Column 1, Line 27, delete "resolution. they" and insert -- resolution, they --, therefor.

In Column 1, Line 64, delete "not. see" and insert -- not, see --, therefor.

In Column 3, Line 3, delete "base stations. in" and insert -- base stations, in --, therefor.

In the Claims

In Column 5, Line 8, in Claim 6, delete "according claim" and insert -- according to claim --, therefor.

Signed and Sealed this  
Ninth Day of September, 2014

Michelle K. Lee  
*Deputy Director of the United States Patent and Trademark Office*